US012459090B2

(12) United States Patent
Akiba et al.

(10) Patent No.: US 12,459,090 B2
(45) Date of Patent: Nov. 4, 2025

(54) DRIVING TOOL

(71) Applicant: MAKITA CORPORATION, Anjo (JP)

(72) Inventors: Yoshitaka Akiba, Anjo (JP); Kiyonobu Yoshikane, Anjo (JP); Tatsuya Ikedo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/441,309

(22) Filed: Feb. 14, 2024

(65) Prior Publication Data

US 2024/0278399 A1 Aug. 22, 2024

(30) Foreign Application Priority Data

Feb. 17, 2023 (JP) ................................ 2023-022988
Dec. 11, 2023 (JP) ................................ 2023-208614

(51) Int. Cl.
*B25C 1/00* (2006.01)
*B25C 1/04* (2006.01)
*B25C 1/06* (2006.01)

(52) U.S. Cl.
CPC .............. *B25C 1/008* (2013.01); *B25C 1/003* (2013.01); *B25C 1/04* (2013.01); *B25C 1/06* (2013.01)

(58) Field of Classification Search
CPC .......... B25C 1/008; B25C 1/003; B25C 1/04; B25C 1/06; B25C 1/047; B25C 1/041; B25C 1/043; B25C 1/001
See application file for complete search history.

(56) References Cited

U.S. PATENT DOCUMENTS 11,224,960 B2 1/2022 Garces et al.
11,446,801 B2 9/2022 Aizawa et al.
2019/0168366 A1* 6/2019 Yasutomi ................ B25C 1/047
2020/0164498 A1* 5/2020 Wechselberger ....... B25C 1/047
2022/0161404 A1 5/2022 Lim et al.
2023/0025226 A1* 1/2023 Aizawa ..................... B25C 1/04
2023/0264332 A1* 8/2023 Neuhoff .................... B25C 1/04
227/107

* cited by examiner

*Primary Examiner* — Veronica Martin
(74) *Attorney, Agent, or Firm* — Oliff PLC

(57) ABSTRACT

A driving tool includes a feeder that successively loads a driving member to a loading position. A driver moves downward in a driving direction to drive the driving member loaded to the loading position. A plurality of driving members are combined in parallel by a flexible member. A lifter engages the driver to move the driver upward in a direction opposite to the driving direction. A position detection sensor detects a rotation position of the lifter to detect a position of the driver. A controller determines that a tip end of the driver is positioned above the loading position according to a signal from the position detection sensor. The controller loads the driving member via the feeder.

17 Claims, 14 Drawing Sheets

DRIVING TOOL

CROSS-REFERENCE

This application claims priority to Japanese patent application serial number 2023-022988, filed on Feb. 17, 2023, and to Japanese patent application number 2023-208614, filed on Dec. 11, 2023, the contents of which are incorporated herein by reference in their entirety for all purposes.

TECHNICAL FIELD

The present invention generally relates to a driving tool for driving a driving member, such as a nail or a staple, into a workpiece, such as, for example, a wooden material.

BACKGROUND ART

A driving tool, for example, includes a feeder (pusher mechanism) that successively supplies a plurality of nails and/or fasteners combined by a coil. The feeder may include a pawl (claw/finger) that engages a leading nail and a solenoid for reciprocating the pawl. The nail supplied by the feeder may be set to a loading position (set position) within an ejection device. A driver in the ejection device may drive the nail set to the loading position. After that, the driver may return to a standby position by a lifter. When the driver returns to the standby position, the solenoid may move the pawl. When a residual quantity of a battery in the driving tool decreases, power supplied to the lifter may also decrease. Because of this, it may sometimes happen that the return of the driver is delayed. In this case, the feeder may supply a nail before the driver returns to the standby position, which may sometimes cause a nail-jamming in the ejection device.

In another example, a driving tool, for example, may include a feeder that is attached to an ejection device. The feeder may be linked to a lifter via a plurality of components. When the lifter returns the driver to a standby position, the feeder may supply a nail in conjunction with the lifter. In a configuration in which the feeder mechanically engages the lifter, the configuration may be complicated. In this case, robustness of the driving tool thus formed may be sometimes insufficient. Also, an accuracy of the nail feeding may be varied, and/or a mechanical loss may increase. Further, the tool may be expensive.

Thus, there is a need for a driving tool in which a driving member can be stably and appropriately supplied in a simple configuration.

SUMMARY

According to one aspect of the present disclosure, a driving tool comprises a feeder that successively loads (feeds) one of a plurality of driving members to a loading position, and the plurality of driving members is combined in parallel by a flexible member. The driving tool also comprises a driver that moves downward in a driving direction for driving each of the plurality of driving members at the loading position. The driving tool also comprises a lifter that engages the driver for moving the driver upward in a direction opposite to the driving direction. The driving tool also comprises a position detection sensor that detects a position of the lifter or the driver. The driving tool also comprises a controller that determines a tip end of the driver is positioned above the loading position according to a first signal from the position detection sensor to load the each of the plurality of driving members to the loading position by the feeder.

Because of this configuration, the feeder is operated by the controller. Accordingly, it is not necessary that the feeder is mechanically engages the lifter, thereby simplifying a structure of the driving tool. The feeder is operated after a tip end of the driver is positioned above the loading position. Because of this, the driving member can be loaded (fed) without interfering with the driver. In this simple configuration, the driving member can be loaded (fed) to the loading position at an appropriate timing.

DETAILED DESCRIPTION

Figure 1:
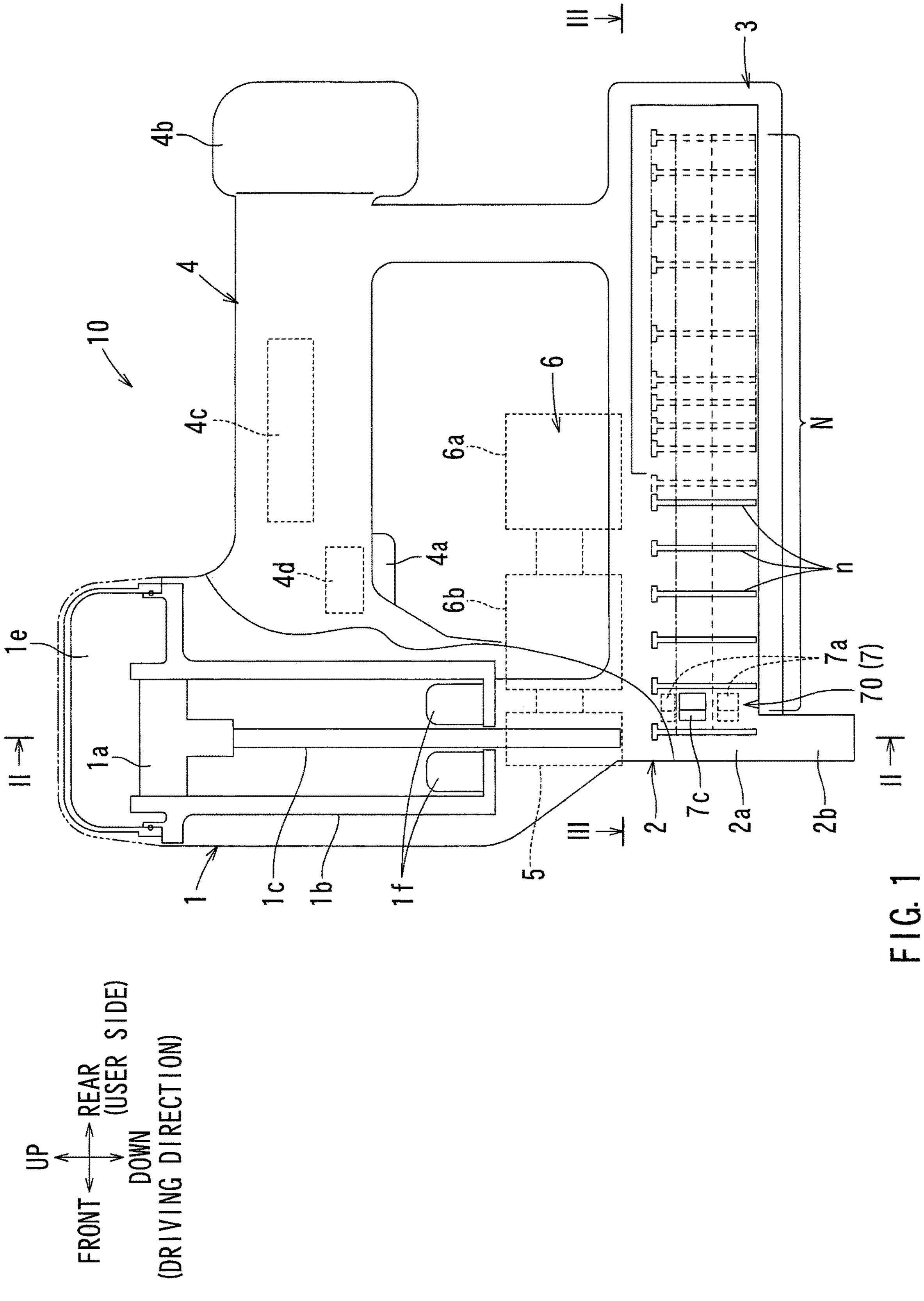
FIG. 1 is a schematic right side view, including a partial sectional view, of a driving tool according to a first embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the driving tool further comprises a switch coupled to an operation portion. The controller operates the feeder to load each driving member in a loading position when the controller determines that (i) the tip end of the driver is positioned above the loading position according to the first signal from position detection sensor and (ii) the operation portion is operated according to a second signal from the switch. Because of this configuration, when the tip end of the driver is positioned above the loading position and the operation portion is operated by a user, the controller loads a driving member to the loading position. In other words, a driving member is not loaded (fed) to the loading position before the operation portion is operated. Accordingly, if the driver is mistakenly operated, a driving member is prevented from being driven. The determination of the position of the driver and the determination of the operation of the operation portion can be made in either order.

According to another aspect of the present disclosure, the driving tool further comprises a switch coupled to an operation portion. The driver moves downward for driving each driving member according to a second signal from the switch. The controller operates the lifter for moving the driver upward to a standby position such that the tip end of the driver at the standby position is above the loading position. The controller determines that the driver is at the standby position by the position detection sensor. Because of this configuration, the rotation detection sensor detects that the lifter moves the driver to the standby position. Accordingly, a driving member can be loaded (fed) to the loading position at an appropriate and precise timing.

According to another aspect of the present disclosure, the position detection sensor includes a magnet and a hall sensor for detecting magnetism of the magnet. Because of this configuration, the position of the driver or the lifter can be detected by the simple sensor.

According to another aspect of the present disclosure, the position detection sensor detects a rotation position of the lifter for determining a position of the driver. Because of this configuration, the position of the driver can be detected without providing the position detection sensor in the driver that largely moves in an up-down direction (in a driving direction). Accordingly, the position detection sensor is less likely to be damaged.

According to another aspect of the present disclosure, the lifter rotates by an electric motor. Also, the position detection sensor includes a magnet provided in the lifter and a hall sensor for detecting magnetism of the magnet, and the hall sensor is attached to a housing that houses the lifter. Because of this configuration, the hall sensor is attached to the housing that does not rotate, thereby easily applying power to the hall sensor. Also, the hall sensor is less likely to be damaged.

According to another aspect of the present disclosure, the magnet is provided in a rotation member that is arranged in the lifter and rotates integrally with the lifter. Because of this configuration, the magnet rotates integrally with the lifter. Accordingly, the hall sensor easily and precisely detects the rotation position of the lifter.

According to another aspect of the present disclosure, the lifter includes a wheel and a plurality of pins arranged around an outer periphery of the wheel at specified intervals. Also, the magnet is attached to the wheel. Because of this configuration, the magnet is easily attached to the wheel that is larger than a small engaging pin. The engaging pin is configured to directly receive a force from the driver. The magnet attached to the wheel is less likely to be damaged.

According to another aspect of the present disclosure, the feeder includes (i) a pawl for loading the each driving member in a feeding direction and (ii) a solenoid for moving the pawl. Because of this configuration, the feeder can be comprised by simple members.

According to another aspect of the present disclosure, the feeder further includes a spring that biases the pawl toward a side of the loading position. Also, the solenoid moves the pawl against a biasing force of the spring. Because of this configuration, the pawl can be retained on the side of the loading position owing to a biasing force of the spring.

According to another aspect of the present disclosure, the feeder further includes a check pawl that prevents each driving member from moving in a direction opposite to the feeding direction. Because of this configuration, the driving member can be avoided from moving in an anti-feeding direction.

According to another aspect of the present disclosure, the driving tool further comprises a piston coupled to the driver, and a cylinder that generate a pressure of a gas owing to an upward movement of the piston. Because of this configuration, the driver can drive a driving member owing to a pressure of the gas.

Next, an embodiment according to the present disclosure will be described with reference to FIGS. 1 to 9. FIG. 1 shows an example of a driving tool 10. The driving tool 10 of FIG. 1 is, for example, a gas-spring type driving tool 10 that utilizes a pressure of a gas for driving a driving member n. In the following explanation, a driving direction of the driving member n is a downward direction, and a direction opposite to the driving direction is an upward direction. In FIG. 1, a user of the driving tool 10 may be generally situated on a rear side of the driving tool 10 such that the user holds the driving tool 10 by a hand to operate. The rear side of the driving tool 10 may be also referred to as a user side, and a side in a forward direction may be referred to as a front side. A left and right side may be based on a user's position when situated on the rear side of the driving tool 10.

As shown in FIG. 1, the driving tool 10 may include a tool main body 1. The tool main body 1 may be configured to include a tubular cylinder **1*b* extending in an up-down direction. A piston 1*a* may be housed within the cylinder 1*b*, so as to be able to be reciprocated in the up-down direction. An upper portion of the cylinder 1*b*, which is a portion above the piston 1*a*, may communicate with an accumulation chamber 1*e*. A compressible gas such as, for example, air may be filled in the accumulation chamber 1*e*. A pressure of the gas filled in the accumulation chamber 1*e* may act on an upper surface of the piston 1*a*, thereby providing a thrust power for moving the piston 1*a* downward (for moving the piston 1*a*** in a driving direction).

Figure 3:
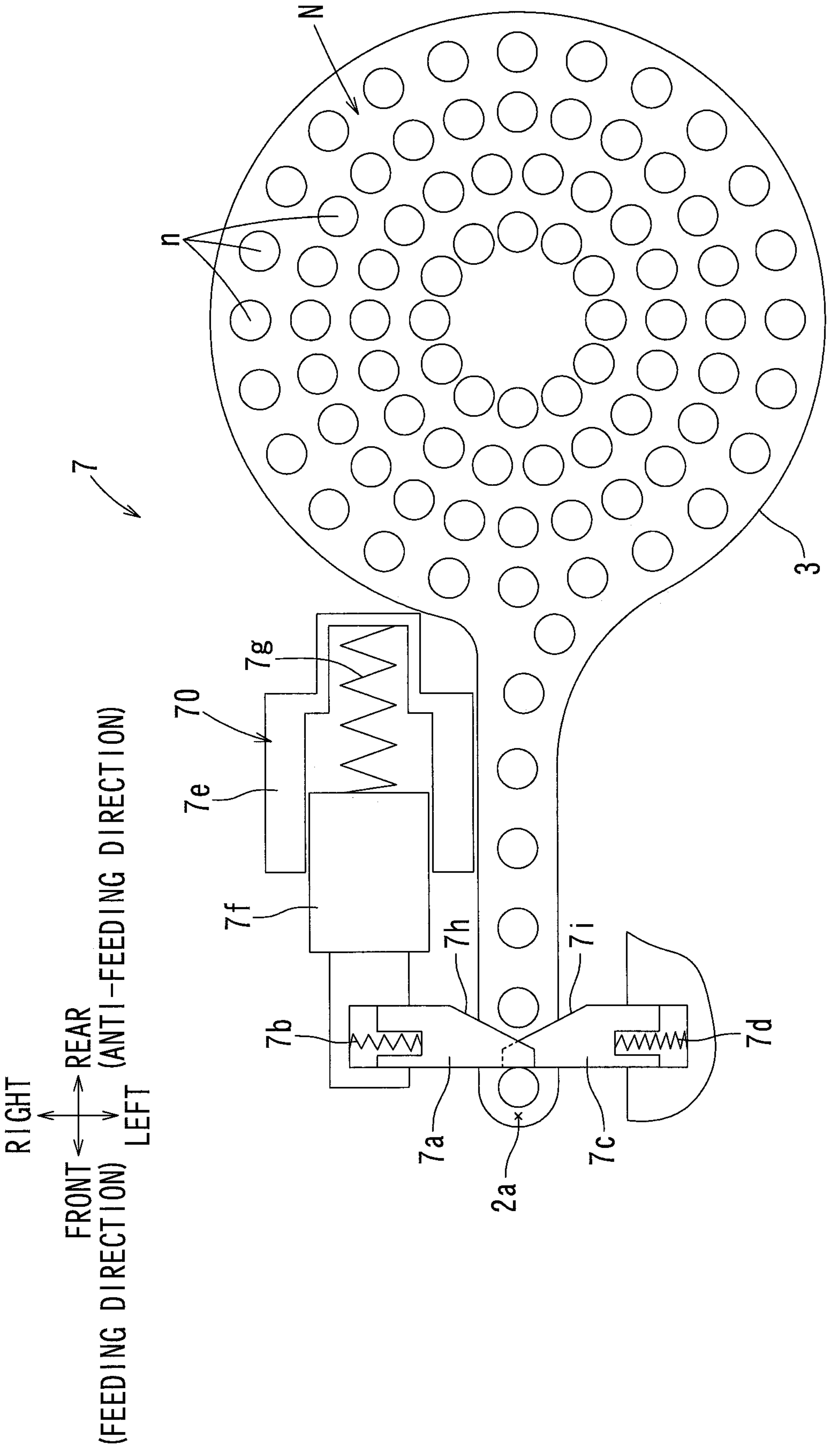
FIG. 3 is a cross-sectional view taken along line III-III of FIG. 1.

As shown in FIG. 1, a driving nose 2 may be formed in a lower portion of the tool main body 1. A driving passage **2*a* may be formed in an interior of the driving nose 2. An upper end of the driving passage 2*a* may communicate with a lower portion of the cylinder 1*b*. The driving nose 2 may be linked to a magazine 3 in which a combined-driving-member N is loaded. The combined-driving-member N may include a plurality of driving members n. The plurality of driving members n may be temporarily combined in parallel by a flexible member such as, for example, a resin sheet or a wire. As shown in FIG. 3, the combined-driving member N may be loaded to the magazine so as to be wound in a coil shape. As shown in FIG. 1, the plurality of driving members n may be supplied from the magazine 3 to the driving passage 2***a* one by one extending in an up-down direction. A contact arm, which is not shown in FIG. 1, may be arranged in a lower portion of the driving nose 2 so as to be slidable in the up-down direction. The contact arm may move upward along the driving nose 2 by contacting a workpiece W.

Figure 5:
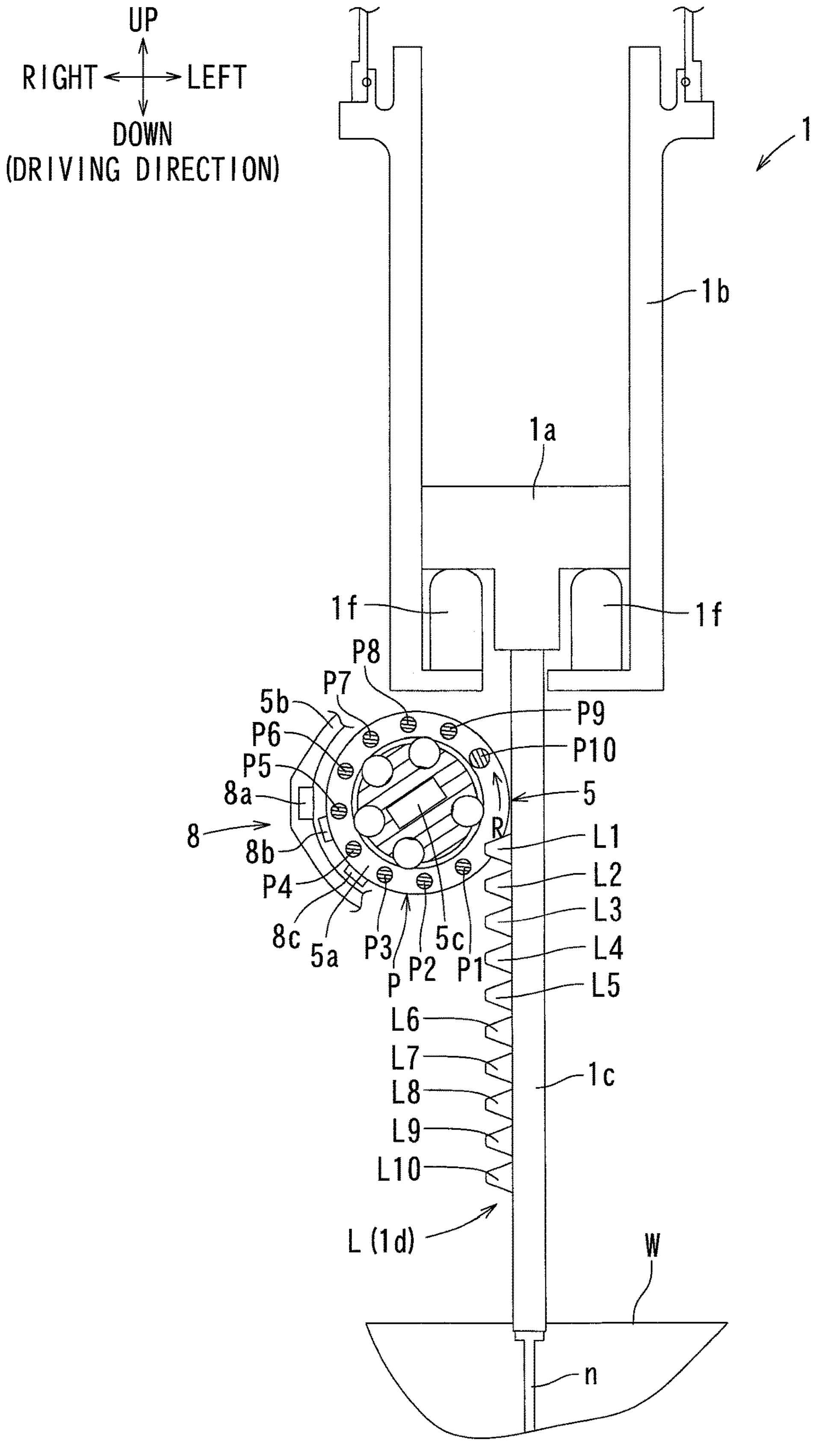
FIG. 5 is a figure showing that a driver has driven a driving member.

As shown in FIG. 1, a driver 1*c* extending in the up-down direction may be connected to a lower surface of the piston 1*a*. A lower portion of the driver 1*c* may enter the driving passage 2*a*. Referring to FIG. 5, the driver 1*c* may move downward in the driving passage 2*a* owing to a pressure of the gas filled in the accumulation chamber 1*e*, which acts on an upper surface of the piston 1*a*. A tip end (lower end) of the driver 1*c* may drive a driving member n supplied to the driving passage 2*a*. The driving member n driven by the driver 1*c* may be ejected from an ejection port 2*b*. The ejected driving member n may be driven into the workpiece W. A damper 1*f* may be arranged at a lower portion of the cylinder 1*b* so as to absorb an impact when the piston 1*a* moves to a lowermost end. The damper 1*f* may be made of, for example, a rubber member.

Figure 2:
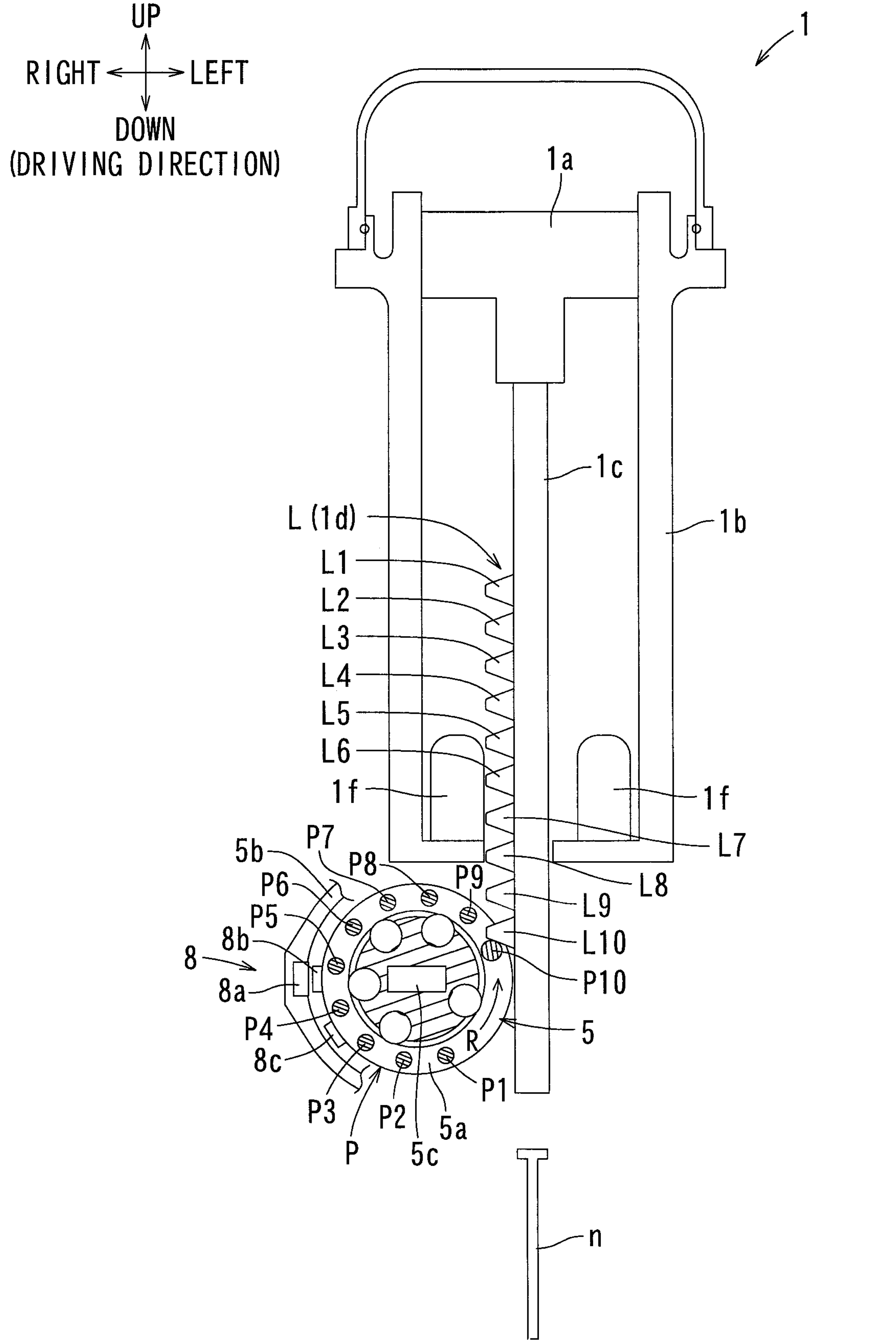
FIG. 2 is a cross-sectional view taken along line II-II of FIG. 1.

As shown in FIG. 2, a rack 1*d* may be formed on a right side of the driver 1*c*. The rack 1*d* may include a plurality of engaged portions L, for example, ten engaged portions L. Each of the plurality of engaged portions L may be formed in a protruding shape extending in a rightward direction toward a wheel 5*a*. The plurality of engaged portions L may be arranged at equal intervals in a longitudinal direction of the driver 1*c* (in the up-down direction). In the following explanation, each of the plurality of engaged portions L may be referred to as a first engaged portion L1, a second engaged portion L2, a third engaged portion L3, . . . , a ninth engaged portion L9, and a tenth engaged portion L10 in order from the top. The plurality of engaged portions may engage a lifter 5.

As shown in FIG. 1, a grip 4 for a user to hold may be formed in a rear portion of the tool main body 1. An operation portion 4*a* for a user to pull by a user's finger to operate may be formed on a front lower surface of the grip 4. A pulling operation of the operation portion 4*a* may be effective when the user moves the contact arm relative to the driving nose 2. The pulling operation of the operation portion 4*a* may cause a switch 4*d* to send a signal to a controller 4*c*. The controller 4*c* may drive a driving section 6 according to the signal from the switch 4*d*. A battery attachment portion may be formed on a rear side of the grip 4. A battery pack 4*b* may be removably attached to a rear surface of the battery attachment portion. The battery pack 4*b* may be removed from the battery attachment portion so as to be recharged by a dedicated charger for reuse.

The lifter 5 shown in FIG. 2 may be linked to a right side of the driving nose 2 shown in FIG. 1. The lifter 5 may move the driver 1*c* and the piston 1*a* upward after a driving member n has been driven into the workpiece W. By the upward movement of the piston 1*a*, the pressure of the gas filled in the accumulation chamber 1*e* may increase. As shown in FIG. 1, the driving section 6 for driving the lifter 5 may be arranged on a rear side of the lifter 5. The driving section 6 may include an electric motor 6*a* serving as a driving source of the driving section 6. The battery pack 4*b* may serve as a power source for the electric motor 6*a*. The motor 6*a* may be connected to the lifter 5 via a reduction portion 6*b*. Rotation power of the motor 6*a* may be reduced by the reduction portion 6*b* to output to the lifter 5.

Figure 4:
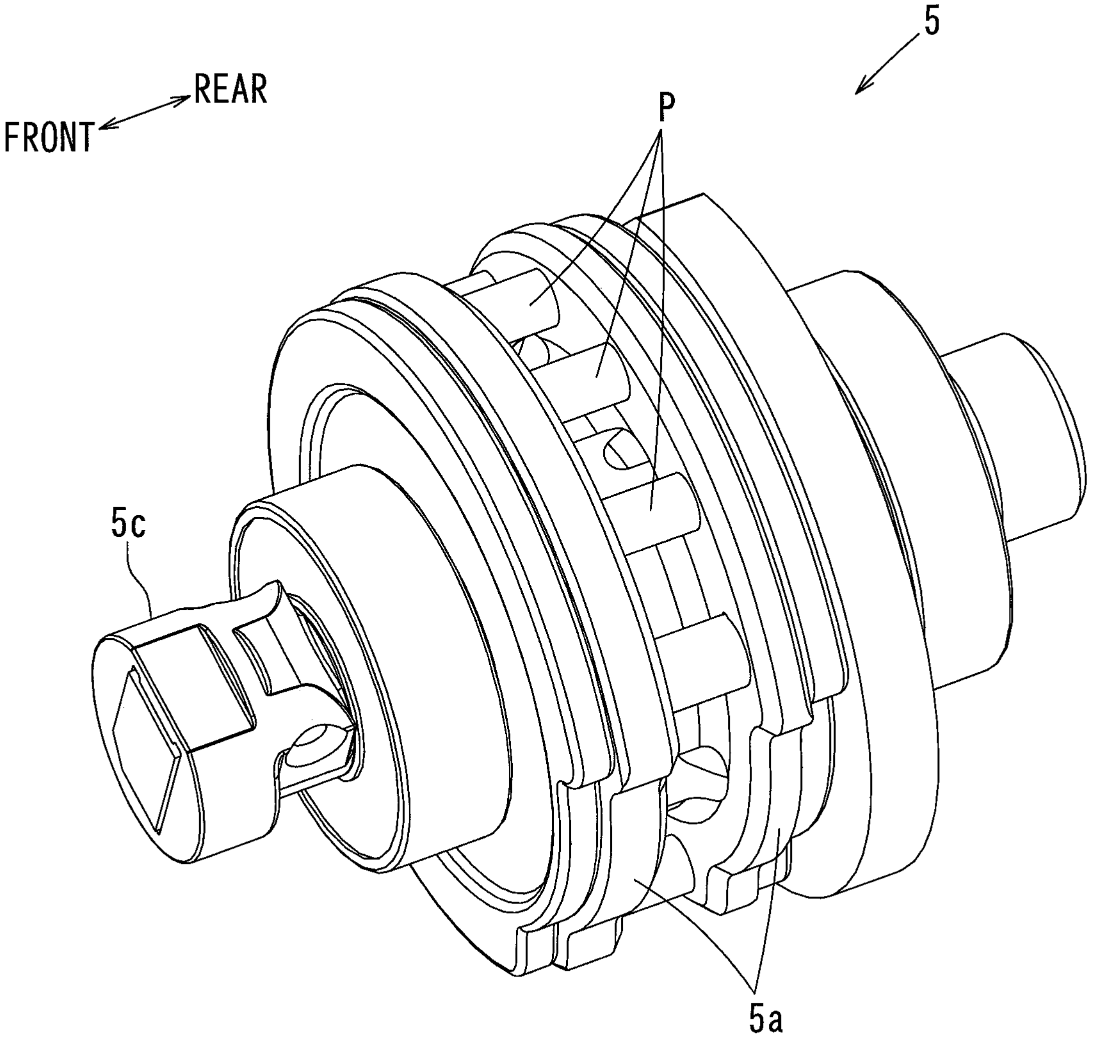
FIG. 4 is a perspective view of a lifter according to the first embodiment of the present disclosure.

As roughly shown in FIG. 2, the lifter 5 may be housed in an approximately tubular housing 5*b*. The lifter 5 may include a rotation shaft 5*c* and a wheel 5*a*. The rotation shaft 5*c* may be supported by the reduction portion 6*b*, and the wheel 5*a* may be supported by the rotation shaft 5*c*. When the motor 6*a* is activated, the rotation shaft 5*c* and the wheel 5*a* may integrally rotate in a direction indicated by an arrow R (direction R), i.e., a counterclockwise direction in FIG. 2. The wheel 5*a* may be configured to rotate only in the direction R. As shown in FIG. 4, the lifter 5 may include two wheels 5*a* arranged to be faced to each other. A plurality of engaging pins P may be arranged between the wheels 5*a*. As shown in FIG. 2, the plurality of engaging pins P may be arranged at equal intervals along an outer periphery of the wheels 5*a*. The plurality of engaging pins P may be referred to as a first engaging pin P1, a second engaging pin P2, a third engaging pin P3, . . . , a ninth engaging pin P9, and a tenth engaging pin P10 in order from a top side in a rotation direction.

As shown in FIG. 2, the lifter 5 may include a position detection sensor 8 for detecting a rotation position of the lifter 5. The position detection sensor 8 may include two magnets 8*b*, 8*c* and a hall sensor (hall IC) 8*a* for detecting magnetism of the magnet 8*b* and 8*c*. The magnets 8*b*, 8*c* may be arranged along the outer periphery of the wheel 5*a*. The hall sensor 8*a* may be arranged in the housing 5*b*. When the hall sensor 8*a* detects magnetism of the magnet 8*b* and 8*c*, the hall sensor 8*a* may send a signal to the controller 4*c*. Because of this configuration, the controller 4*c* may determine a rotation position of the wheel 5*a*.

FIG. 2 shows a state in which the driver 1*c* returns upward to a standby position. In the standby position, a driving member n, which is a leading driving member of the combined-driving member N, may be positioned within a driving passage 2*a*. Also, in the standby position, the tenth engaging pin P10 (last engaging pin) of the lifter 5 may engage the tenth engaged portion L10 (last engaged portion) of the rack 1*d*. In this state, the driver 1*c* may be retrained at the standby position against a pressure of the gas filled in the accumulation chamber 1*e*. As shown in FIG. 2, when the driver 1*c* is at the standby position, the first magnet 8*b* may be configured to face the hall sensor 8*a*. Because of this configuration, the controller 4*c* may determine that the driver 1*c* is at the standby position. When a user pulls the operation portion 4*a*, the controller 4*c* may drive the driving section 6, thereby rotating the wheel 5*a* in a direction indicated by an arrow R as shown in FIG. 2.

Figure 6:
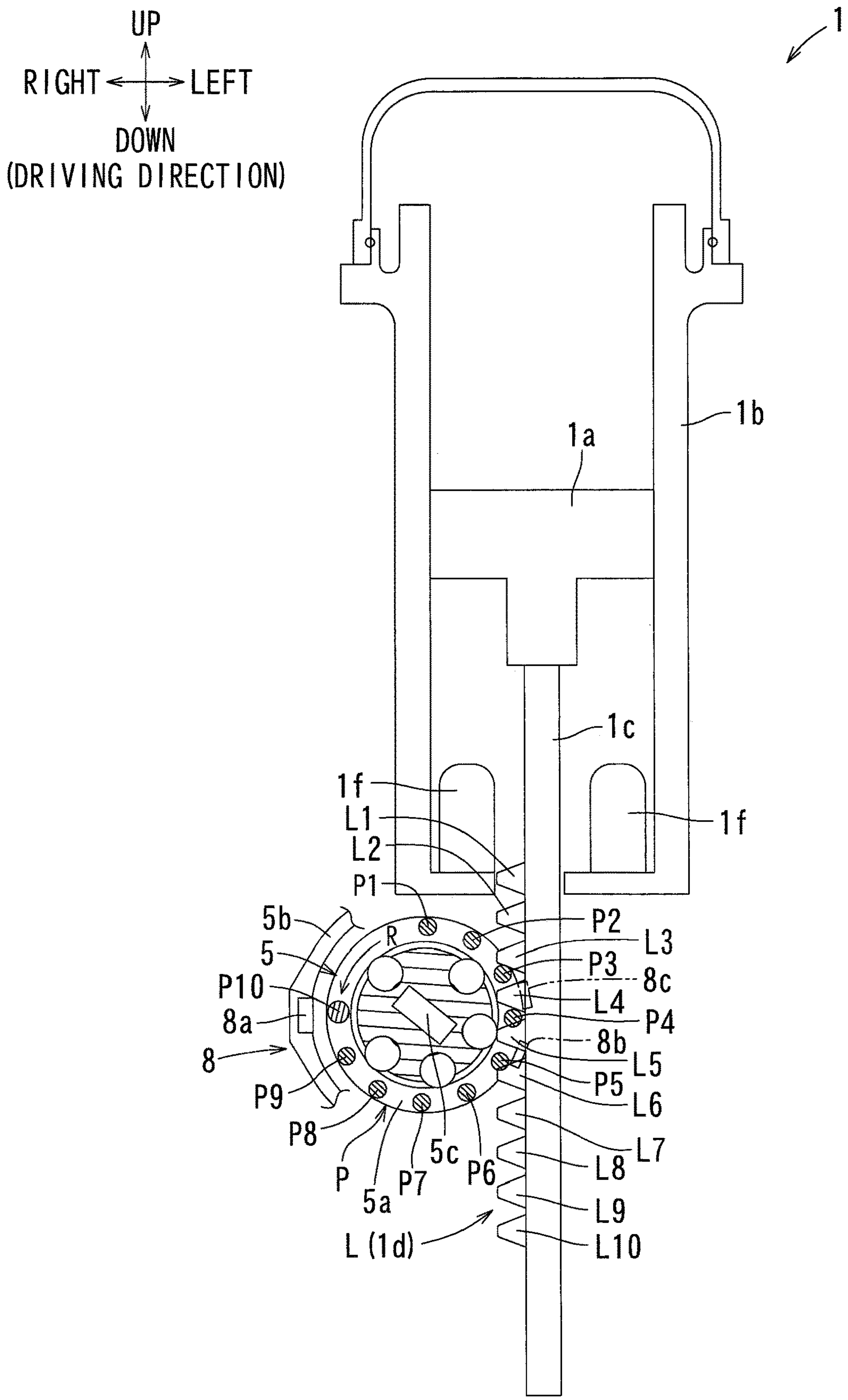
FIG. 6 is a figure showing that a lifter moves the driver in a direction opposite to a driving direction.
Figure 7:
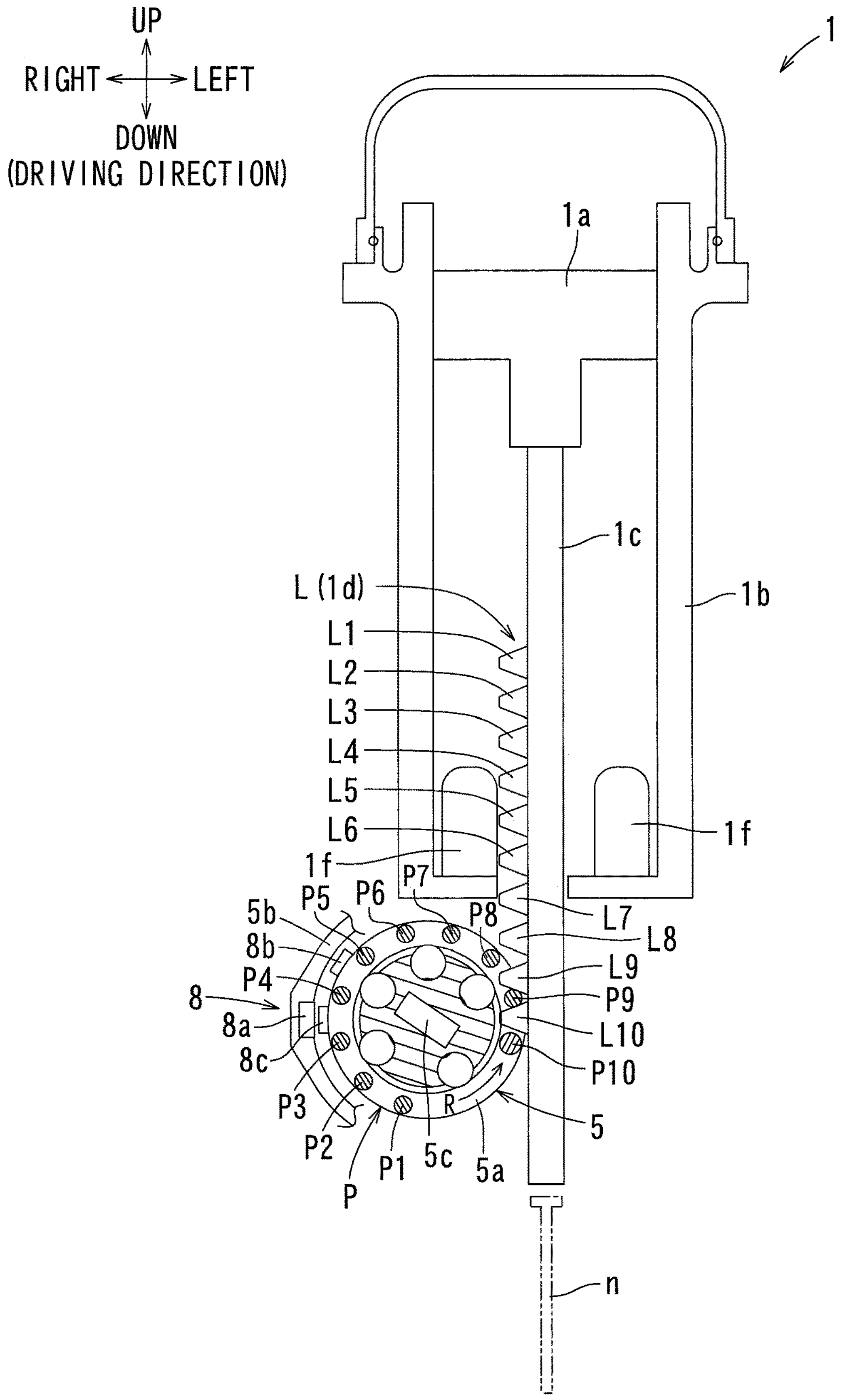
FIG. 7 is a figure showing that a tip end of the driver is above a driving member that is to be driven.

By rotation of the wheel 5*a*, the tenth engaging pin P10 may push the tenth engaged portion L10 upward, thereby releasing the engagement of the tenth engaging pin P10 with the tenth engaged portion L10. Then, as shown in FIG. 5, the piston 1*a* may move downward owing to the pressure of the gas filled in the accumulation chamber 1*c* until the piston 1*c* contacts the damper 1*f*. Because of this, the driver 1*c* may drive the leading driving member n into the workpiece W. When the wheel 5*a* continues to rotate in a direction indicated by an arrow R shown in FIG. 5, the first engaging pin P1 may engage the first engaged portion L1. Then, the second engaging pin P2 may engage the second engaged portion L2, and next the third engaging pin P3 may engage the third engaged portion L3. FIG. 6 shows that the fourth engaging pin P4 starts to engage the fourth engaged portion L4. Each of the engaging pins P may successively engage a corresponding engaged portion L. Because of this successive engagement of the engaging pins P with the engaged portions L, the driver 1*c* and the piston 1*a* may move upward. Normal engagement of the engaging pins P with the engaged portions L may be performed when an engaging pin P assigned a number engages a corresponding engaged portion L assigned the same number as the engaging pin P.

When the wheel 5*a* successively rotates, the second magnet 8*c* may face the hall sensor 8*a*. The hall sensor 8*a* may detect magnetism of the second magnet 8*c*. When the hall sensor 8*a* detects magnetism of the second magnet 8*c*, the hall sensor 8*a* may send a signal to the controller 4*c*. The controller 4*c* may determine that the tip end of the driver 1*c* is positioned above a position (loading position) to which the driving member n is to be set (which is shown by a two-dot chain line in FIG. 7). Then, the controller 4*c* may drive the driving section 6 such that a rotation speed of the wheel 5*a* is decreased. Because of this, an excessive rotation of the wheel 5*a* can be restricted, thereby avoiding the driver 1*c* from passing through the standby position. Furthermore, the controller 4*c* may drive a feeding mechanism 7 such that a driving member n is loaded (fed) to a loading position.

As shown in FIG. 3, the feeding mechanism 7 may include a feeder 70 for loading (feeding) a driving member n to the loading position. The feeder 70 may include a solenoid 7*e* that is operated by the controller 4*c*. The solenoid 7*e* may include a rod 7*f* that is movable in a front-rear direction. A feed pawl 7*a* may be attached to a front end of the rod 7*f*. The feed pawl 7*a* may be biased to protrude toward a side of the driving member n by a spring 7*b*. The feeding mechanism 7 may include a check pawl 7*c* on an opposite side of the driving member n from the feed pawl 7*a* in a left-right direction. In other words, the driving member n may be between the feed pawl 7*a* and the check pawl 7*c* in the left-right direction. The check pawl 7*c* may be biased toward a side of the driving member n by a spring 7*d*. As shown in FIG. 3, the feed pawl 7*a* may be arranged on a right side of the check pawl 7*c*.

Figure 8:
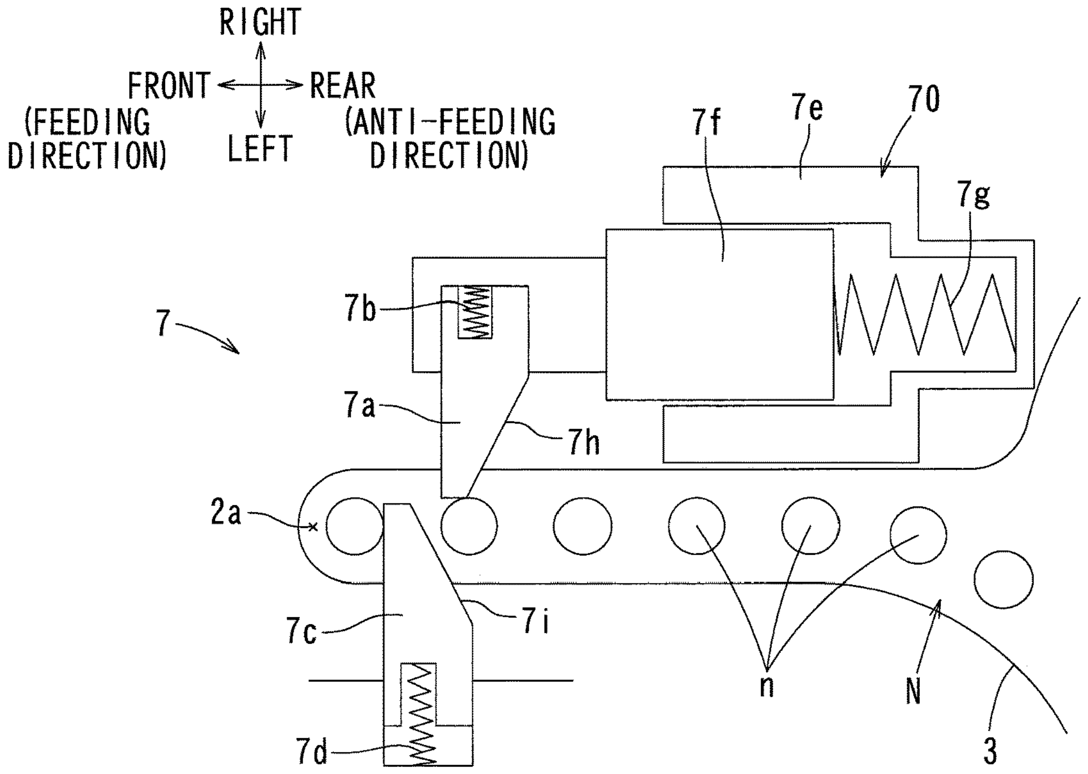
FIG. 8 is a figure showing that a feed pawl is moving in a direction opposite to a feeding direction of the driving member.
Figure 9:
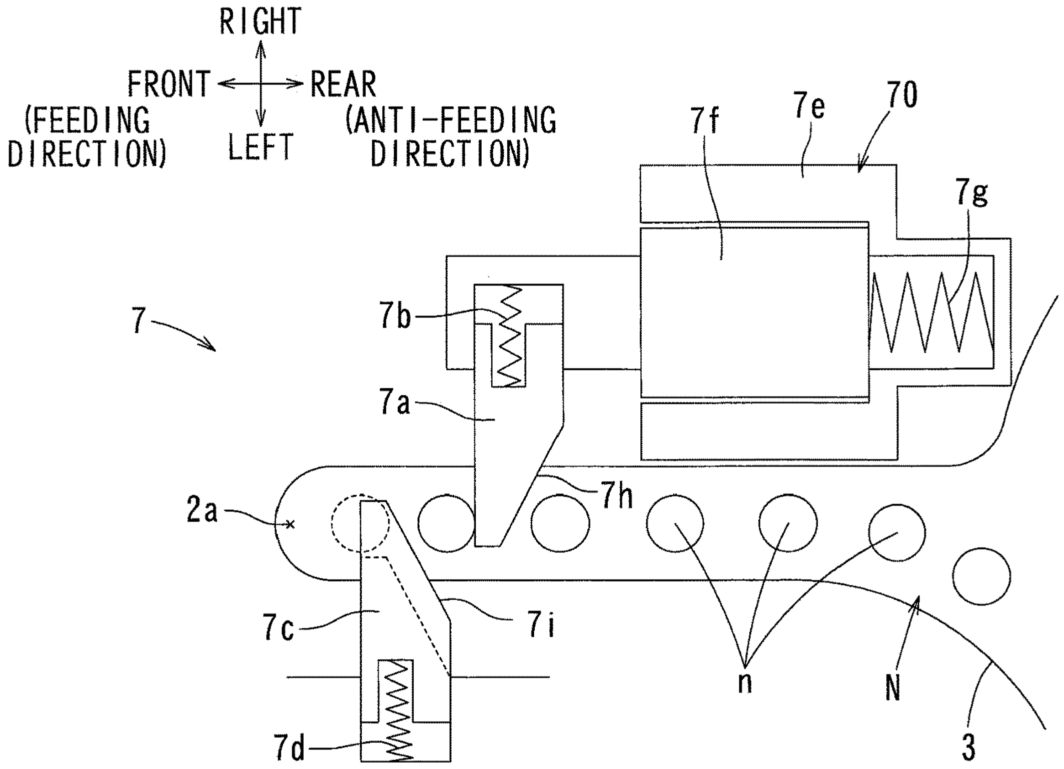
FIG. 9 is a figure showing that the feed pawl has moved in the direction opposite to the feeding direction of the driving member.

As shown in FIG. 3, the rod 7*f* may be biased in a feeding direction by a feed spring 7*g*. When the solenoid 7*e* is powered according to a signal from the controller 4*c*, the rod 7*f* may move in a direction opposite to the feeding direction (anti-feeding direction) against the biasing force of the feed spring 7*g*. As shown in FIG. 3, the feed pawl 7*a* may include a feed-tilted-surface 7*h* that is tilted in a forward direction as it extends toward a side of the driving member n. The feed-tilted-surface 7*h* of the feed pawl 7*a* may contact a driving member n when the feed pawl 7*a* moves in the anti-feeding direction. Because of this configuration, the feed pawl 7*a* may move (retreat) in a direction apart from the driving member n against the biasing force of the spring 7*b*. As shown in FIGS. 8 and 9, the feed pawl 7*a* may ride over the contacted driving member n to move rearward. At the same time, as shown in FIG. 8, the combined-driving-member N may be restricted from moving in the anti-feeding direction by the presence of the check pawl 7*c*. Because of this configuration, the combined-driving-member N may not follow the rearward movement of the feed pawl 7*a*.

When the solenoid 7*e* is not powered, the feed pawl 7*a* may move in the feeding direction by the biasing force of the feed spring 7*g*. The feed pawl 7*a* may push the driving member n in the feeding direction. Then, the combined-driving member N may be loaded (fed) toward the driving passage 2*a* and a leading driving member n may be set to the loading position. As shown in FIG. 3, the check pawl 7*c* may include a check-tilted-surface 7*i* that is tilted in a forward direction as it extends toward a side of the driving member n. When the combined-driving-member N is loaded (fed) in the forward direction, the driving n may contact the check-tilted-surface 7*l* from rearward. Because of this, the check pawl 7*c* may move (retreat) in a direction apart from the driving member n against the biasing force of the spring 7. After the feed pawl 7*a* loads (feeds) the driving member n to the loading position, the feed pawl 7*a* may push the driving member n in the feeding direction by the biasing force of the feed spring 7*g*. Because of this configuration, the driving member n that is loaded (fed) to the loading position may be restricted from moving (returning) in the anti-feeding direction.

As discussed above, the driving tool 10 may include the feeder 70 that successively loads (feeds) a driving number n to the loading position as shown in FIG. 3. As shown in FIG. 1, the driver 1*c* may move in the driving direction, i.e., downward to drive a driving member n set at the loading position. A plurality of driving members n may be temporarily combined by a flexible member. As shown in FIG. 2, the lifter 5 may engage the driver 1*c* to move the driver in a direction opposite to the driving direction, i.e., upward. The position detection sensor 8 may detect a rotation position of the lifter 5, which corresponds to a position of the driver 1*c*. When the controller 4*c* receives a signal from the position detection sensor 8, the controller 4*c* may determine that the tip end of the driver 1*c* is positioned above the loading position of the driving member n. Then, the controller 4*c* may load (feed) a driving member n by the feeder 70.

Because of this configuration, the controller 4*c* may control the feeder 70. Accordingly, the feeder 70 may not mechanically engage the lifer 5, thereby simplifying a configuration of the driving tool 10. The feeder 70 may be operated by the controller 4*c* after the tip end of the driver 1*c* is positioned above the loading position of the driving member n. Because of this, a driving member n may be loaded (fed) without interference of the driver 1*c*. In this manner, a driving member n may be loaded (fed) at an appropriate timing owing to a simple configuration.

As shown in FIG. 1, the driving tool 10 may include the switch 4*d* that is turned on/off by the operation portion 4*a*. The controller 4*c* may drive the lifter 5 according to a signal from the switch 4*d*. As shown in FIG. 2, the lifter 5 may move the driver 1*c* upward to a standby position in which the tip end of the driver 1*c* is positioned above a position to which a driving member n is to be set (loading position). The position detection sensor 8 may detect a rotation position of the lifter 5, which corresponds to the standby position of the driver 1*c*. In other words, the position detection sensor 8 may detect when the driver 1*c* is moved to the standby position by the lifter 5. Accordingly, a driving member n may be loaded (fed) to the loading position at an appropriate and precise timing.

As shown in FIG. 2, the position detection sensor 8 may include the magnet 8*b*, 8*c* and the hall sensor 8*a* that detects the magnet 8*b*, 8*c*. Because of this configuration, a rotation position of the lifter 5 and eventually a position of the driver 1*c* in the up-down direction may be detected by simple sensors.

As shown in FIG. 2, the position detection sensor 8 may detect a rotation position of the lifter 5. Accordingly, a position of the driver 1*c* may be detected by the position detection sensor 8 without attaching the position sensor 8 to the driver 1*c* that widely moves in the up-down direction. Because of this, the position detection sensor 8 may be less likely to be damaged.

As shown in FIG. 1, the lifter 5 may be rotated by the motor 6*a*. Also, as shown in FIG. 2, the position detection sensor 8 may include the magnet 8*b*, 8*c* and the hall sensor 8*a* that detects the magnet 8*b*, 8*c*. The magnet 8*b*, 8*c* may be attached to the lifter 5. The hall sensor 8*a* may be attached to the housing 5*b* that houses the lifter 5. In other words, the hall sensor 8*a* may be attached to the housing 5*b* that does not rotate, thereby simply supplying power to the hall sensor 8*a*. Also, the hall sensor 8*a* may be less likely to be damaged.

As shown in FIG. 4, the lifter 5 may include the wheel 5*a* and the plurality of engaging pins P arranged around the outer periphery of the wheel 5*a* at specified intervals. As shown in FIG. 2, the magnet 8*b*, 8*c* may be attached to the wheel 5*a*. In other words, the magnet 8*b*, 8*c* may be easily attached to the wheel 5*a* that is larger than the engaging pins P in terms of size. The engaging pins P may each receive a force directly from the driver 1*c*. Accordingly, the magnet 8*b*, 8*c* may be less likely to be damaged.

As shown in FIG. 3, the feeder 70 may include the feed pawl 7*a* and the solenoid 7*e* that moves the feed pawl 7*a*. Because of this configuration, the feeder 70 may be configured by simple members.

As shown in FIG. 3, the feeder 70 may include the feed spring 7*g* that biases the feed pawl 7*a* toward the loading position of the driving member n. The solenoid 7*e* may move the feed pawl 7*a* against the biasing force of the feed spring 7*g*. Because of this configuration, the feed pawl 7*a* may be retained at a desired position by the biasing force of the feed spring 7*g*.

As shown in FIG. 3, the feed mechanism 7 having the feeder 70 may include the check pawl 7*c*. The check pawl 7*c* may avoid a driving member n from moving in a direction opposite to a feeding direction of the driving member n loaded (fed) by the feed pawl 7*a* of the feeder 70. Accordingly, a driving member n may be avoided from moving in a direction opposite to the feeding direction (anti-feeding direction).

As shown in FIG. 1, the driving tool 10 may include a piston 1*a* connected to the driver 1*c* and a cylinder 1*b* that generates a pressure of the gas by movement of the piston 1*a*. Accordingly, the driver 1*c* may drive a driving member n owing to a pressure of the gas filled in the accumulation chamber 1*e*.

Next, a second embodiment according to the present disclosure will be described with reference to FIGS. 10 to 15. A driving tool 20 of the second embodiment may include a tool main body 21, a lifter 21 and a position detection sensor 28 instead of the tool main body 1, the lifter 5 and the position detection sensor 8. In the following explanation, configurations of the second embodiment which differ from those of the first embodiment will be discussed in detail.

Figure 10:
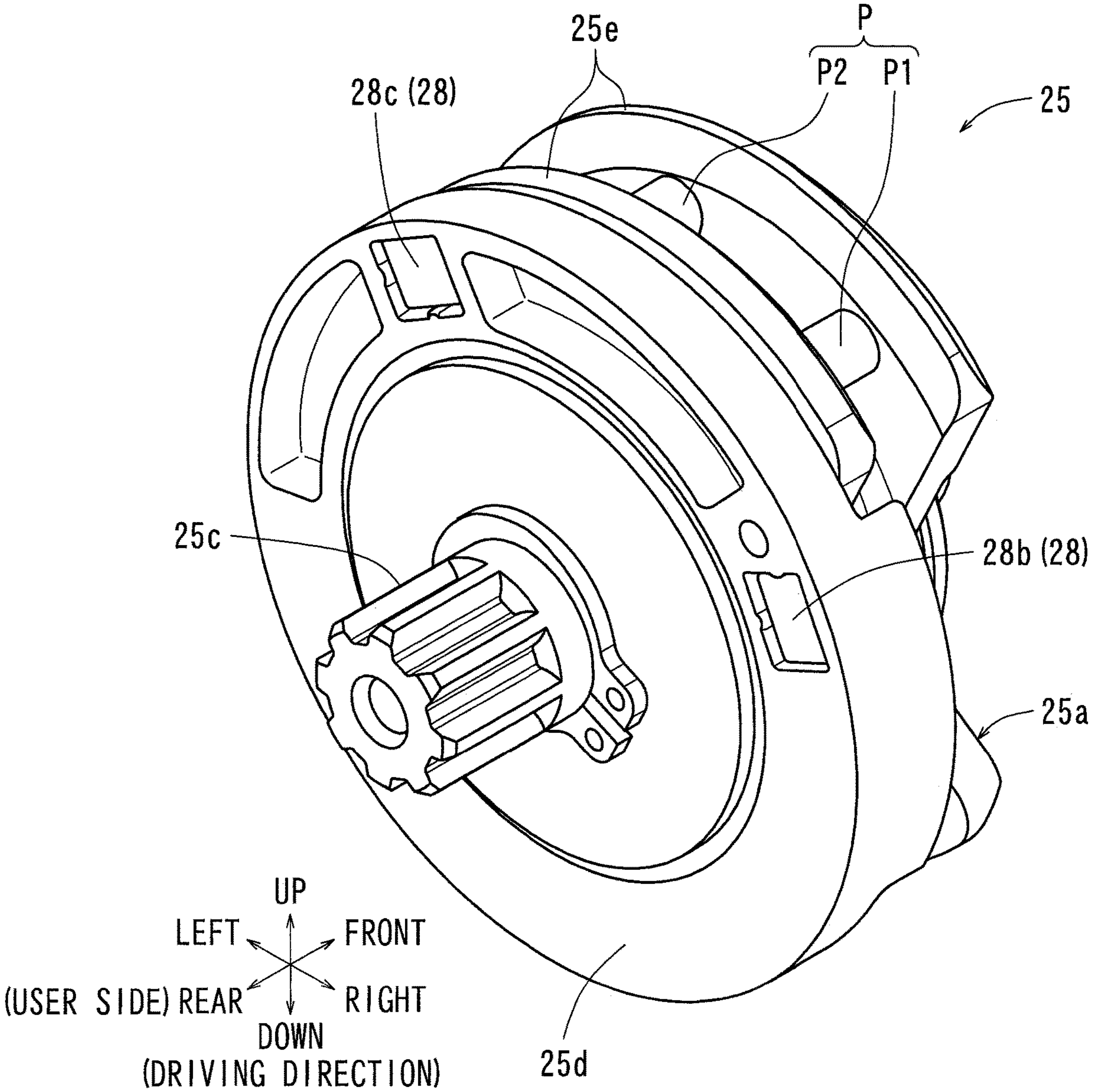
FIG. 10 is a perspective view of a lifter according to a second embodiment of the present disclosure.

As shown in FIG. 10, a lifter 25 may include a rotation shaft 25*c* linked to the reduction portion 6*b* and a wheel 25*a* supported by the rotation shaft 25*c*. The lifter 25 may include a holder 25*d* formed on a rear side of the wheel 25*a*. The holder 25*d* may include a magnet 28*b*, 28*c* for a position detection sensor 28. The wheel 25*a* may include two flanges 25*e*. The two flanges 25*e* may be in parallel to each other at a specified interval in the front-rear direction. A plurality of engaging pins P may be arranged between the two flanges 25*e*.

Figure 11:
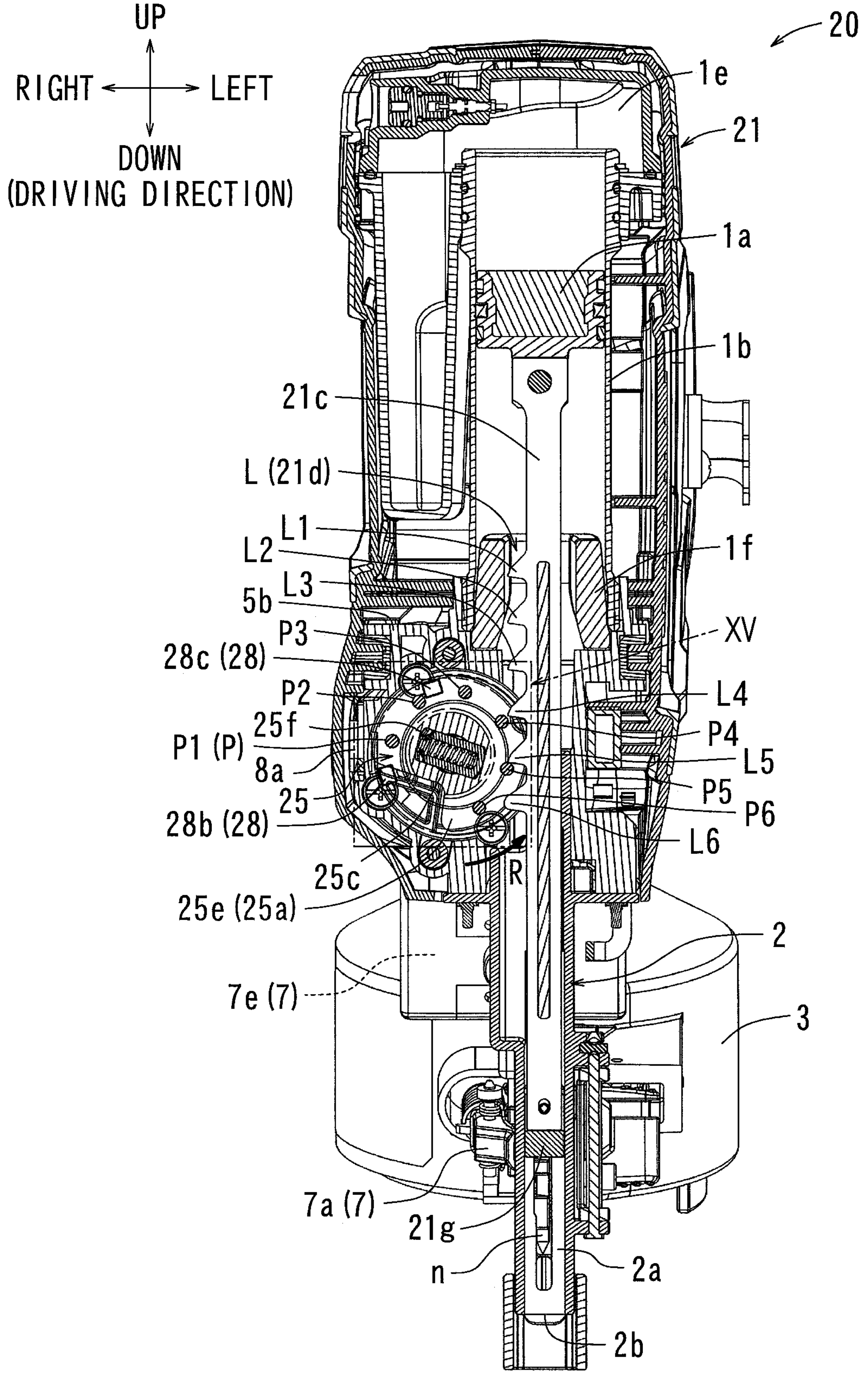
FIG. 11 is a longitudinal cross-sectional view of a driving tool viewed from font according to the second embodiment. This figure shows that a driver is at a standby position.

As shown in FIG. 11, six engaging pins P may be arranged around an outer periphery of the wheel 25*a*. The six engaging pins P may be arranged to cover an approximately three quarters of the circumference of the wheel 25*a*. In other words, no engaging pins P may be disposed in a remaining portion (one quarter) of the peripheral portion of the wheel 25*a*. In the following explanation, the area in which no engaging pins P is disposed may be referred to as a recessed portion. The rotation shaft 25*c* may be supported by a bearing (not shown) so as to be rotatable with respect to the housing 5*b*. When the driving section 6 is driven, the rotation shaft 25*c* may rotate in a direction indicated by an arrow R of FIG. 11 (direction R). Also, the wheel 25*a* and the holder 25*d* may rotate integrally with the rotation shaft 25*c* in the direction indicated by the arrow R of FIG. 11. The lifter 25 may be prohibited from rotating in a direction opposite to the direction indicated by the arrow R.

As shown in FIG. 11, a tool main body 21 may include a driver 21*c* that extends in the up-down direction. The driver 21*c* may include a rack 21*d* on a right side of the driver 21*c*. The rack 21*d* may include, for example, six engaged portions L protruding in a rightward direction. A striker 21*g* for driving a driving member n may be formed at a lower end of the driver 21*c*.

Figure 12:
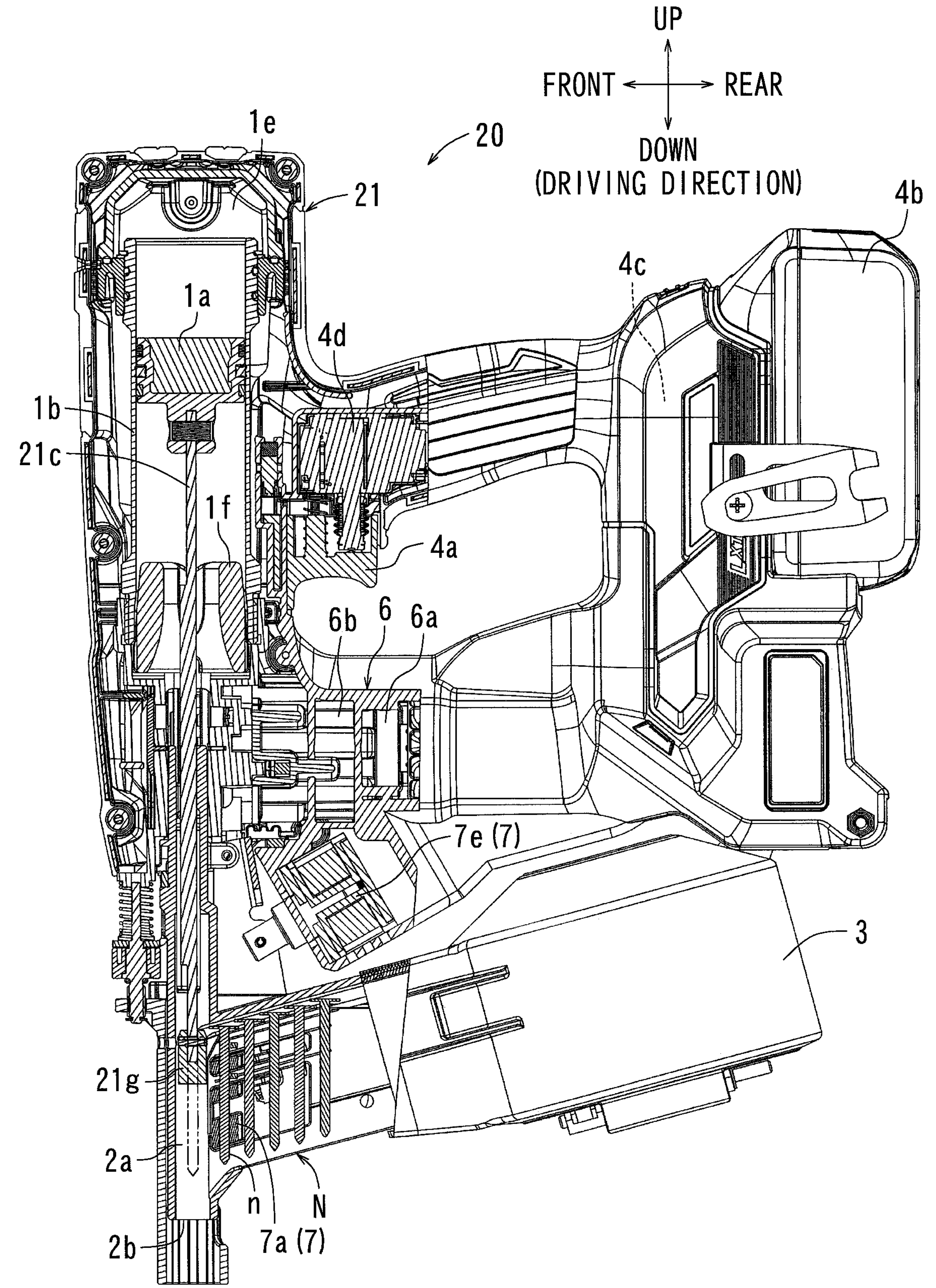
FIG. 12 is a longitudinal cross-sectional view of the driving tool viewed from left, showing the driver is at the standby position.

FIGS. 11 and 12 shows that the driver 21 is positioned at a standby position. When the driver 21 is at the standby position, a fifth engaging pin P5 may engage a fifth engaged portion L5 from below. In this state, the driver 21*c* may be retained at the standby position against a pressure of the gas filled in the accumulation chamber 1*e*. The first magnet 28*b* may be positioned at a position forward in the direction R from a position facing the hall sensor 8*a*. For example, the first magnet 28*b* may be offset from the hall sensor 8*a* in the direction R by about 30 degrees. This offset may be generated owing to an inertia of rotation of the lifter 25 that moves the driver 21*c*.

The hall sensor 8*a* may detect magnetism of the first magnet 28*b* when the first magnet 28*b* passes through a position facing the hall sensor 8*a*. When the hall sensor 8*a* detects magnetism of the first magnet 28*b*, the hall sensor 8*a* may send a signal to the controller 4*c*. Accordingly, the controller 4*c* may determine that the driver 21 is before the standby position. At this time, the controller 4*c* may send a stop signal to the driving section 6. After the lifter 25 rotates by about 30 degrees by the inertia of rotation, rotation of the lifter 25 may stop.

As shown in FIG. 12, a lower portion of the driver 21*c* at the standby position may be within the driving passage 2*a*. The striker 21*g* of the driver 21*c* may overlap a position where a driving member n to be set (a position shown in at a two-dot chain line in FIG. 12). Because of this, when the driver 21*c* is at the standby position, a driving member n cannot be loaded (fed) to the position to be set. Accordingly, if the driver 21*c* moves downward at an unintended timing, the driver 21*c* may not drive a driving member n. Thus, a driving member n can be more reliably prevented from being mistakenly driven.

Referring to FIG. 12, when the operation portion 4*a* is pulled, the switch 4*d* may send a signal to the controller 4*c*. When the controller 4*c* may determine that the operation portion 4*a* has been pulled, the controller 4*c* may operate the electric motor 6*a* of the driving section 6 to rotate. Then, the lifter 25 may rotate in a direction indicated by an arrow R in FIG. 13. The sixth engaging pin P6 may engage the sixth engaged portion L6 by rotation of the wheel 25*a*. Because of this, the driver 21*c* may be moved upward. Accordingly, the striker 21*g* of the driver 21*c* may be positioned above a position where a driving member n to be set. At this time, the second magnet 28*c* may face the hall sensor 8*a*. When the second magnet 28*c* faces the hall sensor 8*a*, the hall sensor 8*a* may send a signal to the controller 4*c*.

When the controller 4*c* receives the signal from the hall sensor 8*a*, the controller 4*c* may determine that a lower portion of the driver 21*c* has been positioned above a position where a driving member n is to be set (a loading position). When the controller 4*c* detects the pulling operation of the operation portion 4*a* and determines the lower portion of the driver is positioned above the loading position, the controller 4*c* may load (feed) a driving member n to the loading position by the feeding mechanism 7. In more detail, when the controller 4*c* detects a pulling operation of the operation portion 4*a*, the controller 4*c* may supply power to the solenoid 7*e*. Then, when the controller 4*c* determines the driver 21*c* is above the loading position, the controller 4*c* may stop supplying power to the solenoid 7*e*. Because of this, the feed pawl 7*a* may move a driving member n in a feeding direction. Accordingly, a leading driving member n may be loaded (fed) to the loading position.

Figure 14:
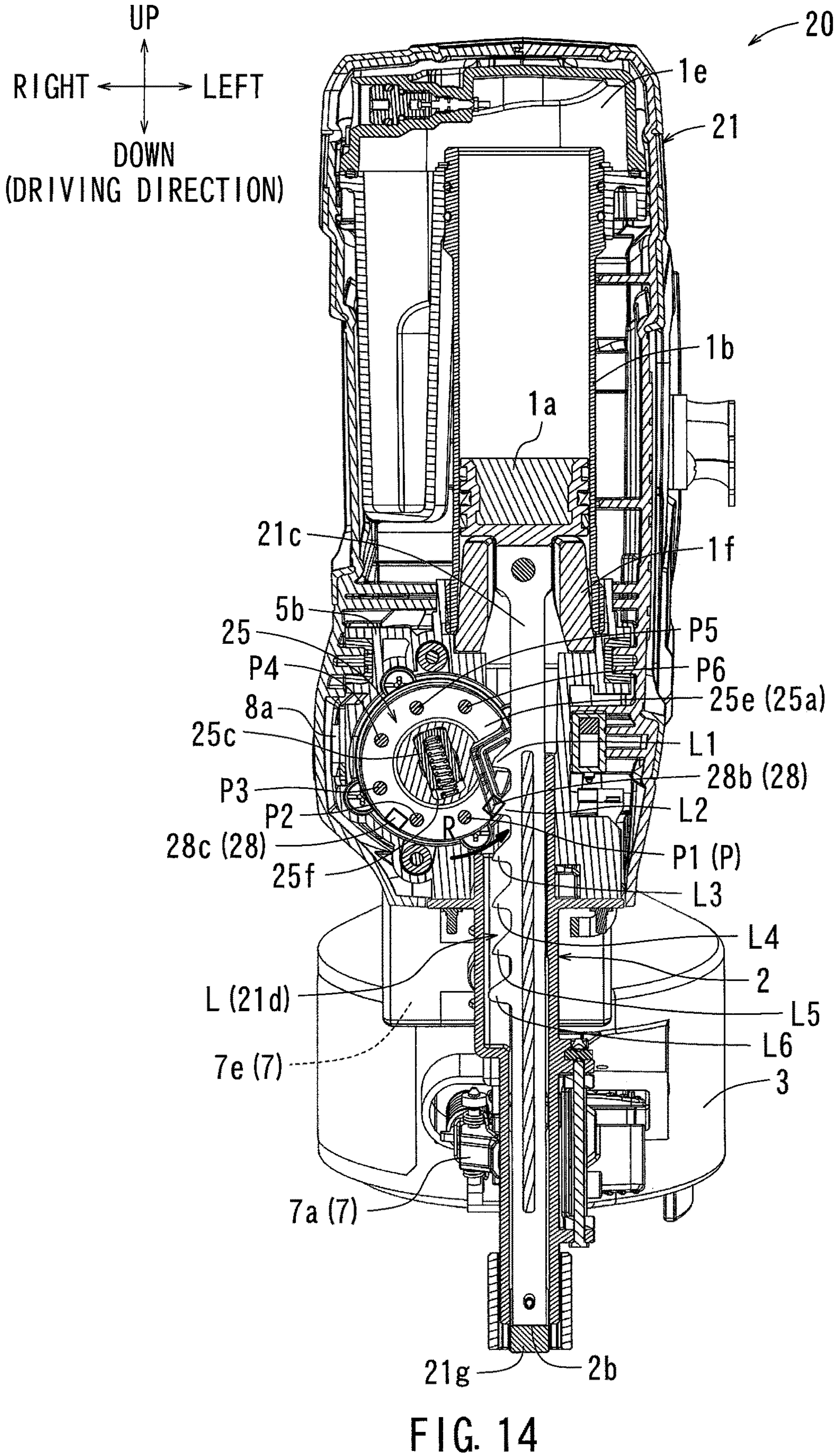
FIG. 14 is a figure showing that the driver has driven the driving member.

As shown in FIG. 14, in parallel with the feeding operation of the driving member n, the wheel 25*a* may continue to rotate. When the wheel 25*a* continues to rotate, the sixth engaging pin P6 may push the sixth engaged portion L6 upward to disengage from the sixth engaged portion L6. As a result, the driver 21*c* may move downward owing to a pressure of the gas filled in the accumulator 1*e*. The solenoid 7*e* may have a sufficiently high response speed in comparison with a rotation speed of the wheel 25*a*. Because of this, a driving member n may be reliably loaded (fed) to the loading position before the driver 21*c* is positioned above the loading position.

Then, the driver 21*c* that moves downward may drive the driving member n loaded (fed) to the loading position. The driving member n may be driven by the driver 21*c* in this manner. After the driving member n has been driven, the wheel 25*a* may continue to rotate in the direction R. Accordingly, the first engaging pin P1 may engage the first engaged portion L1. The wheel 25*a* may rotate in the direction R while being in the engaging state. Each of the plurality of engaging pins P may successively engage a corresponding engaged portion L from below. An engagement of an engaging pin P with a corresponding engaged portion L may be performed properly when the engaging pin P engages the engaged portion L assigned with the same number as the engaging pin P. Accordingly, the driver 21*c* may be moved upward. The controller 4*c* may drive the lifter 25 until the first magnet 28*b* faces the hall sensor 8*a*. The driver 21*c* may move upward to the above-mentioned standby position.

There may be a case where the driver 21*c* does not move downward to a lower end position owing to, for example, a nail jamming. In this case, the first engaging pin P1 may not engage the first engaged portion L1. For example, there may be a case where the first engaging pin P1 engages a protruding portion of the second engaged portion L2 or the third engaged portion L3. In this case, the wheel 25*a* may be slid in a direction far from the driver 21*c* with respect to the rotation shaft 25*c*. The wheel 25*a* may include an elongated shaft hole 25*f* extending in a radial direction of the wheel 25*a*. Because of this configuration, wheel 25*a* may be allowed to move in the radial direction of the wheel 25*a*. Because of this movement, the first engaging pin P1 may be restricted from receiving an excessive load from the engaged portion L. Furthermore, the holder 25*d* of the lifter 25 may not follow a movement of the wheel 25*a* in the radial direction of the wheel 25*a*. The holder 25*d* may only rotate integrally with the rotation shaft 25*c*. Also, the first magnet 28*b* and the second magnet 28*c* may only rotate integrally with the rotation shaft 25*c*.

Figure 15:
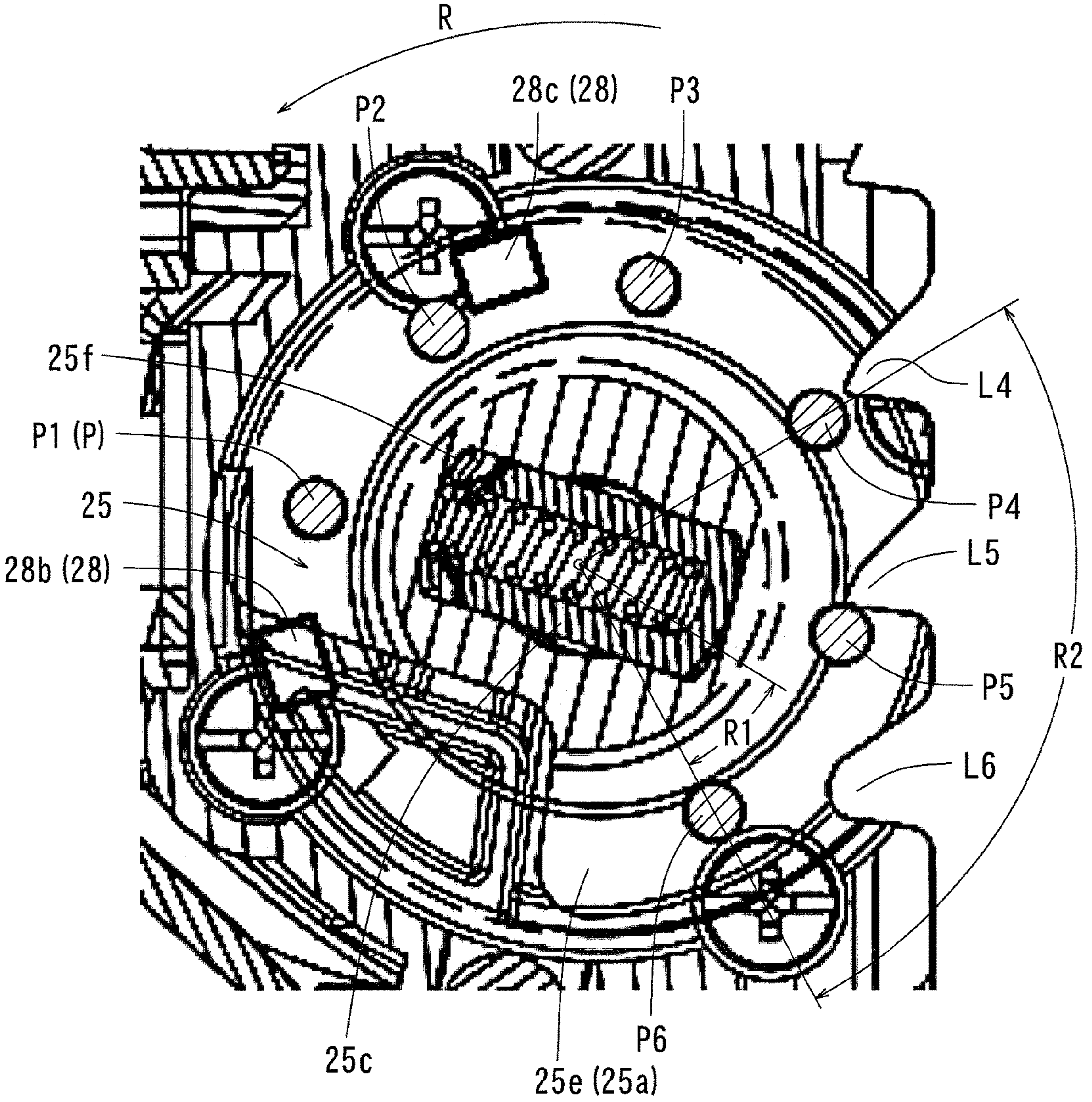
FIG. 15 is an enlarged view of a part XV of FIG. 11.

As shown in FIG. 15, the sixth engaging pin P6 may be arranged in the hindmost position in the rotation direction of the wheel 25*a*. The sixth engaging pin P6 may be the last pin in the direction R. Each of the plurality of engaging pins P may be arranged to be apart from an adjacent engaging pin P by, for example, about 50 degrees in the direction R. Also, a distance from a rotation center of the lifter 25 to a center of each engaging pin P may be, for example, about 15 mm. As discussed above, the driver 21*c* at the standby position may be supported by the fifth engaging pin P5 from below. In other words, the driver 21*c* may be supported by the fifth engaging pin P5 arranged forward in the rotation direction by an angle corresponding to one engaging pin P.

The fifth engaging pin P5 may engage the fifth engaged portion L5 of the driver 21*c*. The fifth engaged portion L5 may be arranged above the sixth engaged portion L6, which is at the lowermost position of the engaged portions L in the up-down direction, by a length corresponding to one engaged portion L. Because of this configuration, the driver 21*c* may stand by at a lower position than in a case where the sixth engaged portion L6 of the driver 21*c* is supported by the sixth engaging pin P6. Because of this, the driver 21 may enter a relatively large area of the driving passage 2*a* at the standby position. Accordingly, the striker 21*g* of the driver 21*c* may largely overlap the loading position of a driving member n (refer to FIG. 12). In other words, a sufficient/large overlap length of the striker 21*g* may be obtained.

The large overlap length may more reliably prevent a driving member n from being loaded (fed) to the loading position. In the preferred embodiment, an overlap length of the driver 21*c* toward the loading direction may be, for example, about 15 mm, which is measured from an upper top end of the driving member n. More preferably, an overlap length of the driver 21*c* may be, for example, 10-20 mm in this nail feeding mechanism. In the present embodiment, the driving member n may be, for example, about 45 mm in length. Thus, the driver 21*c* may overlap a driving member n by about one-third of a longitudinal length of the driving member n in the present embodiment. In the nail feeding mechanism, it may preferable that an overlap length of the driver 21*c* may be about one-third to two-thirds of a driving member n.

As shown in FIG. 15, it may be preferable that the driver 21*c* is supported by an engaging pin P that is arranged within a range between more than an angle R1 and less than an angle R2, each of which is measured from the sixth engaging pin P6 (last engaging pin). In this embodiment, the angle R1 may be, for example, about 30 degrees. The angle R2 may be, for example, about 100 degrees. Accordingly, the driver 21*c* at the standby position may be supported by the fourth engaging pin P4 that is arranged forward in the rotation direction by about 100 degrees from the sixth engaging pin P6. In this manner, the driver 21*c* may be supported by an engaging pin P arranged forward in the rotation direction by an angle corresponding to two engaging pins P. An engaging pin P supporting the driver 21*c* may be modified according to an interval of engaging pins P and a diameter of the wheel 25*a*. For example, when a rotation diameter of each engaging pin P around a center of the wheel 25*a* is 15 mm and an angle interval between the engaging pins P is 30 degrees, the driver 21*c* may be supported by an engaging pin arranged forward in the rotation direction by an angle corresponding to three engaging pins P.

Figure 13:
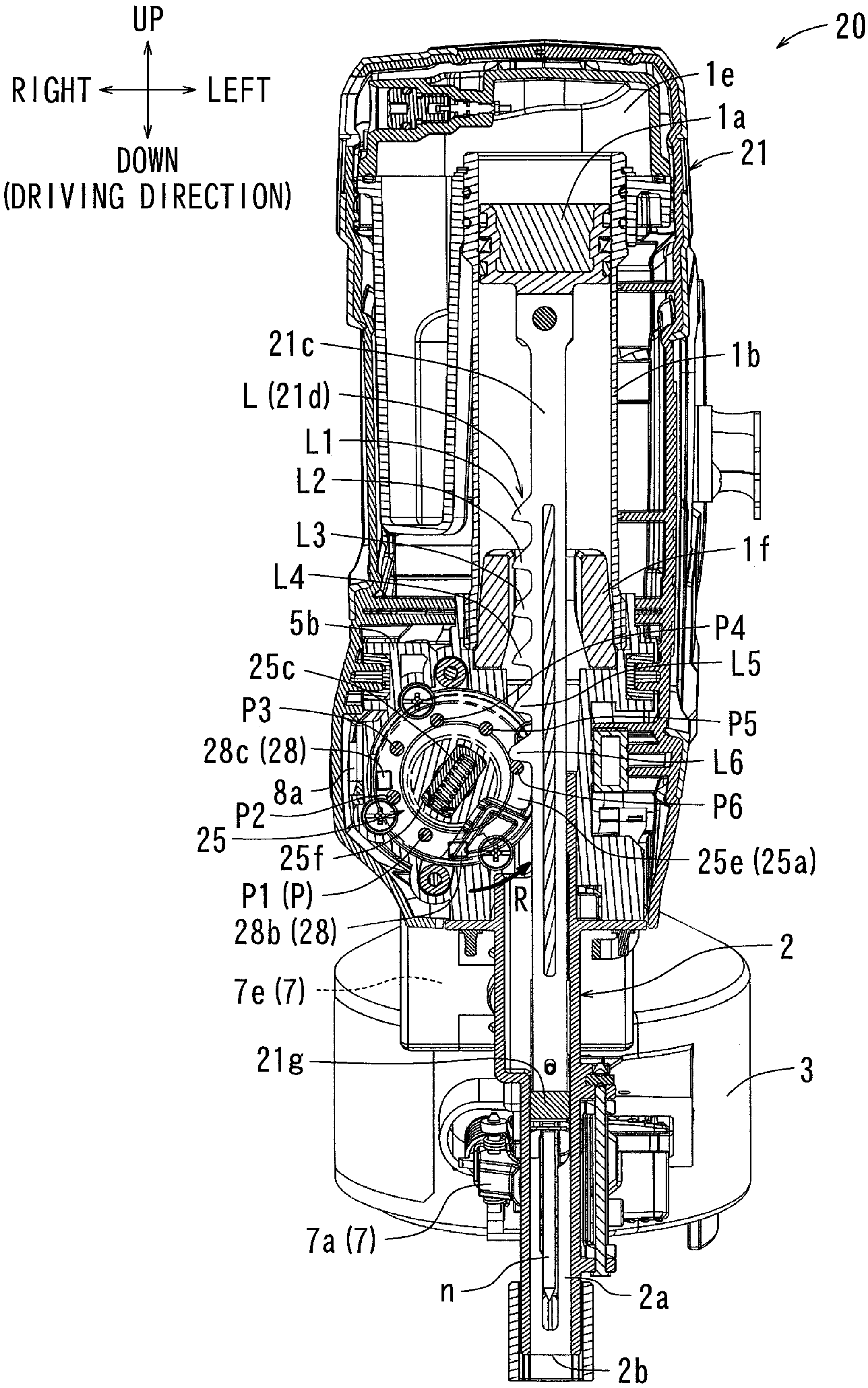
FIG. 13 is a figure showing that a tip end of the driver is above a driving member that is to be driven.

Referring to FIGS. 11 and 13, since the driver 21 stands by at a relatively lower position, a moving distance of the driver 21*c* from the standby position to the loading position may be made large. Because of this, a relatively long time period may be obtained from a time when power is supplied to the solenoid 7*e* to a time when power to the solenoid 73 is shut off. Accordingly, a nail feeding operation performed by the solenoid 7*e* may be stabilized. It may sometimes happen that the sixth engaged portion L6 wears owing to a friction that is occurred when an engagement with the sixth engaging pin P6 is released. In this case, a top dead center of the driver 21*c* may be lowered, which may cause a downward movement of the driver 21*c* to start earlier. In such a case, by enlarging a moving distance of the driver 21*c* from the standby position to the loading position, an operation of the solenoid 7*e* can be more reliably performed in an appropriate manner.

In a case where a large overlap length is not especially required, a longer distance from a position of the driver 21*c* immediately before a downward movement (a top dead center) to the loading position of the driver 21*c* may be obtained by size modifications of components, for example, intervals of the engaged portions and/or a diameter of the wheel 25*a*, etc., which may sometimes cause a standby position of the driver 21*c* to be relatively lowered. In other words, a longer moving distance of the driver 21*c* may be obtained owing to a longer distance from the top dear center to the loading position. Accordingly, when the driver 21*c* drives a driving member n, the driver 21*c* may be more accelerated owing to the longer moving distance, thereby more reliably separating a driving member n from the combined-driving member N to drive the separated driving member n into the workpiece W.

As discussed above, the driving tool 20 may include the driver 21*c* that drives a driving member n. The plurality of engaged portions L (rack 21*d*) of the driver 21*c* may be arranged in the driving direction of the driver 21*c*. Each of the plurality of engaging pins P of the lifter 25 may engage a corresponding one of the plurality of engaged portions L to move the driver upward, i.e., in a direction opposite to the driving direction. The controller 4*c* may drive the electric motor 6*a* to move the driver 21*c* upward. When the controller 4*c* detects a signal from the position detection sensor 28, the controller 4*c* may stop the upward movement of the driver 21*c* to position (retain) the driver 21*c* to the standby position. When the lifter 25 engages an engaged portion L arranged above the lowermost engaged portion in the up-down direction by one engaged portion to three engaged portions L, the position detection sensor 28 may send a signal to the controller 4*c*. In more detail, when the lifter 25 engages the engaged portion P3, P4 or P5, the position detection sensor 28 may send a signal to the controller 4*c*.

As discussed above, the driving tool 20 may include the switch 4*d* that is turned on/off by a pulling operation of the operation portion 4*a*. The controller 4*c* may determine that the operation portion 4*a* is operated according to a signal from the switch 4*d*. The controller 4*c* may determine that the tip end of the driver 21*c* is positioned above the loading position according to a signal from the position detection sensor 28. The controller 4*c* may operate the feeder 70 to load (feed) a driving member n. Accordingly, the controller 4*c* may operate the feeder 70 to load (feed) a driving member n, when the tip end is positioned above the loading position and also the operation portion 4*a* is operated. In other words, before the operation portion 4*a* is operated, a driving member n may not be loaded (fed) to the loading position. Thus, if the driver 21 is mistakenly operated, a driving member n may be prevented from being driven. The determination of the position of the driver 1*c* and the determination of the pulling operation of the operation portion 4*a* may be made in either order.

As shown in FIG. 10, the magnet 28*b*, 28*c* may be attached to the holder 25*d* of the lifter 25. The holder 25*d* may rotate integrally with the lifter 25. Accordingly, the magnet 28*b*, 28*c* may rotate integrally with the lifter 25. Thus, the hall sensor 8*a* may detect a rotation position of the lifter 25 in a precise manner.

The embodiments discussed above may be modified in various ways. In the above embodiment, the driving tool 10 may be a gas-spring type driving tool that utilizes a pressure of the gas. Instead, the driving tool 10 may be a mechanical-spring type driving tool. Also, a combined-driving-member N may be a plate-shaped combined-driving-member.

Furthermore, a solenoid 7*e* may be configured to be driven in a feeding direction according to a signal from the controller 4*c*, thereby loading (feeding) a driving member n to the loading position.

Furthermore, a position detection sensor 8 may be configured to be attached to the driver 1*c* for detecting a position of the driver 1*c*. A position detection sensor 8 may be configured to detect a standby position of the driver 1*c*. A position detection sensor 8*c* may be attached to an arbitrary position. The controller 4*c* may be configured to send a signal to the feeder 70 when detecting the standby position of the driver 1*c*. Furthermore, it may be configured such that the hall sensor 8*a* is attached to the wheel 5*a* and the magnets 8*b* and 8*c* are attached to the housing 5*b*. The hall sensor 8*a* and the magnet 8*b*, 8*c* may be attached to an engaging pin P, respectively. The magnet 8*b*, 8*c* may be inserted to recessed portions formed in the housing 5*b*. Furthermore, only a single magnet may be used.

In the above embodiment, the lifter 5 may include the plurality of engaging pins P. Instead, the lifter 5 may include a plurality of protruding portions such as, for example, pinion teeth. In this case, the driver 1*c* may include a plurality of pins serving as engaged portions L. A number of engaging pins P and engaged portions L may be arbitrary.

The driving tool 10 in the embodiment may be one example of a driving tool according to one aspect or other aspects of the present disclosure. The driving member n in the embodiment may be one example of a driving member according to one aspect or other aspects of the present disclosure. The feeder 70 in the embodiment may be one example of a feeder according to one aspect or other aspects of the present disclosure. The driver 1*c* in the embodiment may be one example of a driver according to one aspect or other aspects of the present disclosure. The lifter 5 in the embodiment may be one example of a lifter according to one aspect or other aspects of the present disclosure. The position detection sensor 8 in the embodiment may be one example of a position detection sensor according to one aspect or other aspects of the present disclosure. The controller 4*c* in the embodiment may be one example of a controller according to one aspect or other aspects of the present disclosure.

The operation portion 4*a* in the embodiment may be one example of an operation portion according to one aspect or other aspects of the present disclosure. The switch 4*d* in the embodiment may be one example of a switch according to one aspect or other aspects of the present disclosure.

The magnet 8*b*, 8*c* in the embodiment may be one example of a magnet according to one aspect or other aspects of the present disclosure. The hall sensor 8*c* in the embodiment may be one example of a hall sensor according to one aspect or other aspects of the present disclosure.

The electric motor 7*a* in the embodiment may be one example of an electric motor according to one aspect or other aspects of the present disclosure. The housing 5*b* in the embodiment may be one example of a housing according to one aspect or other aspects of the present disclosure.

The wheel 5*a* in the embodiment may be one example of a wheel according to one aspect or other aspects of the present disclosure. The engaging pin P in the embodiment may be one example of an engaging pin according to one aspect or other aspects of the present disclosure. The rotation shaft 5*c* in the embodiment may be one example of a rotation shaft according to one aspect or other aspects of the present disclosure.

The feed pawl 7*a* in the embodiment may be one example of a feed pawl according to one aspect or other aspects of the present disclosure. The solenoid 7*c* in the embodiment may be one example of a solenoid according to one aspect or other aspects of the present disclosure.

The feed spring 7*g* in the embodiment may be one example of a feed spring according to one aspect or other aspects of the present disclosure.

The feeding mechanism 7 in the embodiment may be one example of a feeding mechanism according to one aspect or other aspects of the present disclosure. The check pawl 7*c* in the embodiment may be one example of a check pawl according to one aspect or other aspects of the present disclosure.

The piston 1*a* in the embodiment may be one example of a piston according to one aspect or other aspects of the present disclosure. The cylinder 1*b* in the embodiment may be one example of a cylinder according to one aspect or other aspects of the present disclosure.

The holder 25*d* in the embodiment may be one example of a holder according to one aspect or other aspects of the present disclosure.

What is claimed is:

1. A driving tool, comprising:

a feeder configured to load each of a plurality of driving members to a loading position, the plurality of driving members being combined in parallel by a flexible member;

a driver configured to move downward in a driving direction for driving each of the plurality of driving members at the loading position;

a lifter configured to engage the driver for moving the driver upward in a direction opposite to the driving direction;

a position detection sensor configured to detect a position of the lifter or the driver;

a switch coupled to an operation portion; and a controller configured to determine that a tip end of the driver is positioned above the loading position in the direction opposite to the driving direction according to a first signal from the position detection sensor to load the each of the plurality of driving members to the loading position via the feeder without interfering with the driver;

operate the feeder to load the each of the plurality of driving members to the loading position when the controller determines that (i) the tip end of the driver is positioned above the loading position according to the first signal from position detection sensor and (ii) the operation portion is operated according to a second signal from the switch; and determine that the driver is positioned at a standby position according to a third signal from the position detection sensor, wherein the driver overlaps the loading position in the driving direction at the standby position from 10 mm to 20 mm.

2. The driving tool according to claim 1, wherein:

the driver is configured to move downward for driving the each of the plurality of driving members according to the second signal from the switch; and the controller is configured to operate the lifter for moving the driver upward to the standby position such that the tip end of the driver at the standby position is further above the loading position.

3. The driving tool according to claim 1, wherein the position detection sensor includes a magnet and a hall sensor for detecting magnetism of the magnet.

4. The driving tool according to claim 1, wherein the position detection sensor detects a rotation position of the lifter for determining a position of the driver.

5. The driving tool according to claim 1, wherein:

the lifter is rotated by an electric motor; and the position detection sensor includes a magnet provided in the lifter and a hall sensor for detecting magnetism of the magnet, the hall sensor attached to a housing that houses the lifter.

6. The driving tool according to claim 5, wherein the magnet is provided in a rotation member that is arranged in the lifter and that rotates integrally with the lifter.

7. The driving tool according to claim 5, wherein:

the lifter includes a wheel and a plurality of pins arranged around an outer periphery of the wheel at specified intervals; and the magnet is attached to the wheel.

8. The driving tool according to claim 1, wherein the feeder includes (i) a pawl for loading the each of the plurality of driving members in a feeding direction and (ii) a solenoid for moving the pawl.

9. The driving tool according to claim 8, wherein:

the feeder further includes a spring configured to bias the pawl toward a side of the loading position; and the solenoid moves the pawl against a biasing force of the spring.

10. The driving tool according to claim 8, wherein the feeder further includes a check pawl that prevents the each of the plurality of driving members from moving in a direction opposite to the feeding direction.

11. The driving tool according to claim 1, further comprising:

a piston coupled to the driver; and a cylinder generating a pressure of a gas owing to an upward movement of the piston.

12. The driving tool of claim 1, wherein the lifter further comprises (i) a rotation shaft supported by a reduction portion and (ii) a wheel supported by the rotation shaft.

13. A driving tool, comprising:

a tool main body configured to include a tubular cylinder extending in an up-down direction;

a feeder configured to load each of a plurality of driving members to a loading position, the plurality of driving members being combined in parallel by a flexible member;

a driver configured to move downward in a driving direction for driving the each of the plurality of driving members at the loading position;

a piston coupled to the driver and housed within the tubular cylinder, the piston being configured to reciprocate in the up-down direction;

a lifter configured to engage the driver for moving the driver upward in a direction opposite to the driving direction, the lifter configured to rotate by an electric motor;

a position detection sensor configured to detect a rotation position of the lifter for determination of a position of the driver in the up-down direction, wherein the position detection sensor includes a plurality of magnets and a hall sensor for detecting magnetism of each of the plurality of magnets and the hall sensor is attached to a housing that houses the lifter;

a switch coupled to an operation portion; and a controller configured to determine that a tip end of the driver is positioned above the loading position in the direction opposite to the driving direction according to a first signal from the position detection sensor by use of a first magnet of the plurality of magnets and the hall sensor to load the each of the plurality of driving members to the loading position via the feeder without interfering with the driver; and determine that the driver is at a standby position such that the tip end of the driver is further above the loading position according to a second signal from the position detection sensor by use of a second magnet of the plurality of magnets and the hall sensor, wherein, the plurality of magnets is provided in a rotation member that is arranged in the lifter and that rotates integrally with the lifter, and the driver is configured to move downward for driving the each of the plurality of driving members according to a third signal from the switch.

14. The driving tool according to claim 13, wherein an upper portion of the cylinder is configured to communicate with an accumulation chamber for moving the piston downward.

15. The driving tool according to claim 13, further comprising a driving nose formed in a lower portion of the tool main body.

16. The driving tool according to claim 15, wherein:

the driving nose includes a driving passage formed within an interior of the driving nose; and an upper end of the driving passage communicates with a lower portion of the cylinder.

17. The driving tool according to claim 13, wherein, the lifter further comprises a rotation shaft and a wheel supported by the rotation shaft, and the wheel is configured to be allowed to move in a radial direction of the wheel.

* * * * *